US012745227B2

(12) United States Patent
Mu

(10) Patent No.: US 12,745,227 B2
(45) Date of Patent: Sep. 22, 2026

(54) RESOURCE POOL CONFIGURATION METHODS AND APPARATUSES AND STORAGE MEDIA

(71) Applicant: Beijing Xiaomi Mobile Software Co., Ltd., Beijing (CN)

(72) Inventor: Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 326 days.

(21) Appl. No.: 18/579,430

(22) PCT Filed: Jul. 14, 2021

(86) PCT No.: PCT/CN2021/106320
§ 371 (c)(1),
(2) Date: Jan. 15, 2024

(87) PCT Pub. No.: WO2023/283837
PCT Pub. Date: Jan. 19, 2023

(65) Prior Publication Data

US 2024/0340875 A1 Oct. 10, 2024

(51) Int. Cl.
*H04W 72/40* (2023.01)
*H04W 72/0453* (2023.01)
*H04W 72/51* (2023.01)

(52) U.S. Cl.
CPC ....... *H04W 72/0453* (2013.01); *H04W 72/40* (2023.01); *H04W 72/51* (2023.01)

(58) Field of Classification Search
CPC .. H04W 72/0453; H04W 72/40; H04W 72/51
See application file for complete search history.

(56) References Cited

U.S. PATENT DOCUMENTS

| | | | | |
|---|---|---|---|---|
| 11,064,434 | B2 * | 7/2021 | Lin | H04W 52/0225 |
| 2019/0029020 | A1 * | 1/2019 | Zhao | H04W 72/04 |
| 2019/0165971 | A1 * | 5/2019 | Manolakos | H04L 25/0226 |
| 2020/0178217 | A1 * | 6/2020 | Huang | H04W 24/10 |

(Continued)

FOREIGN PATENT DOCUMENTS

| | | | | |
|---|---|---|---|---|
| CN | 106793154 A | | 5/2017 | |
| CN | 109548173 A | * | 3/2019 | H04W 76/10 |

(Continued)

OTHER PUBLICATIONS

State Intellectual Property Office of the People's Republic of China, Office Action and Search Report Issued in Application No. 202180002135X, May 29, 2025, 22 pages. (Submitted with Machine/Partial Translation).

(Continued)

*Primary Examiner* — Fahmida S Chowdhury
(74) *Attorney, Agent, or Firm* — Volpe Koenig

(57) ABSTRACT

A method, apparatus, and a storage medium for configuring a resource pool in a wireless communication system. The resource pool is configured by: determining resource pool configuration information; where the resource pool configuration information is used to indicate a frequency domain bandwidth of one or more resource pools, and the frequency domain bandwidth belongs to a bandwidth capability range supported by a first-type terminal.

20 Claims, 7 Drawing Sheets

S41

A frequency domain span between monitoring resource pools to be switched is determined.

S42

In response to determining that the frequency domain span between the monitoring resource pools to be switched is greater than a bandwidth capability range supported by the first-type terminal, data transmission and reception are stopped for second time.

(56) References Cited

U.S. PATENT DOCUMENTS

2020/0267523 A1* 8/2020 Tang ........................ H04L 5/001
2020/0328865 A1* 10/2020 Choi ..................... H04L 5/0092
2021/0051653 A1* 2/2021 Park ...................... H04W 72/21
2021/0168814 A1* 6/2021 Chen ..................... H04L 5/0007
2021/0212099 A1 7/2021 Yi et al.
2021/0235432 A1* 7/2021 Zhao ................... H04W 72/044
2021/0337517 A1* 10/2021 Li ......................... H04L 5/0044
2021/0345300 A1* 11/2021 Selvanesan ....... H04W 72/0453
2021/0392609 A1* 12/2021 Siomina ................ H04W 64/00
2022/0200774 A1* 6/2022 Yang ....................... H04L 5/001
2023/0354311 A1* 11/2023 Xue .................. H04W 72/1268
2024/0340875 A1* 10/2024 Mu ....................... H04W 72/40

FOREIGN PATENT DOCUMENTS

CN 111436089 A 7/2020
CN 112840726 A 5/2021
CN 112889334 A 6/2021
EP 3897050 A1 * 10/2021 ............ H04W 72/23
EP 4358455 B1 * 12/2025 ........... H04L 5/0048
WO WO-2019029733 A1 * 2/2019 ............ H04W 76/10
WO WO-2020227869 A1 * 11/2020 ............ H04W 72/51
WO WO-2023283837 A1 * 1/2023 ............ H04W 72/02

OTHER PUBLICATIONS

ISA State Intellectual Property Office of the People's Republic of China, Written Opinion of the International Searching Authority Issued in Application No. PCT/CN2021/106320, Feb. 24, 2022, WIPO, 6 pages.

ISA State Intellectual Property Office of the People's Republic of China, International Search Report Issued in Application No. PCT/CN2021/106320, Feb. 24, 2022, WIPO, 4 pages.

Intel Corporation "Considerations on Sidelink Communication Enhancements for Wearable and IoT Use Cases" "3GPP TSG RAN1 WG Meeting #88bis R1-1704706 Spokane, USA, Apr. 3-7, 2017" Mar. 24, 2017, 7 pages.

* cited by examiner

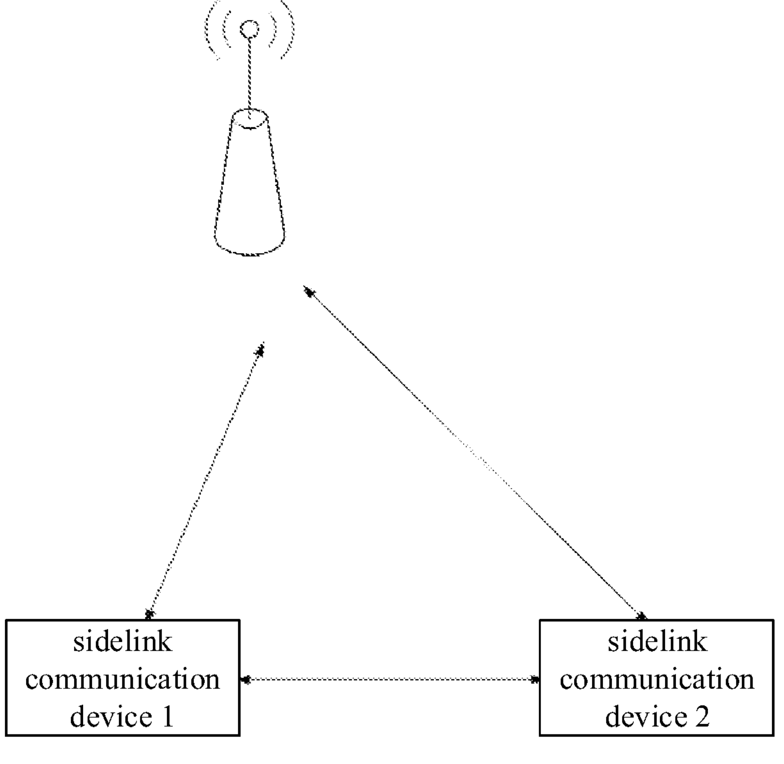

FIG.1

Resource pool configuration information is determined, where the resource pool configuration information is used to indicate a frequency domain bandwidth of a resource pool, and the frequency domain bandwidth of the resource pool indicated by the resource pool configuration information belongs to a bandwidth capability range supported by the first-type terminal.

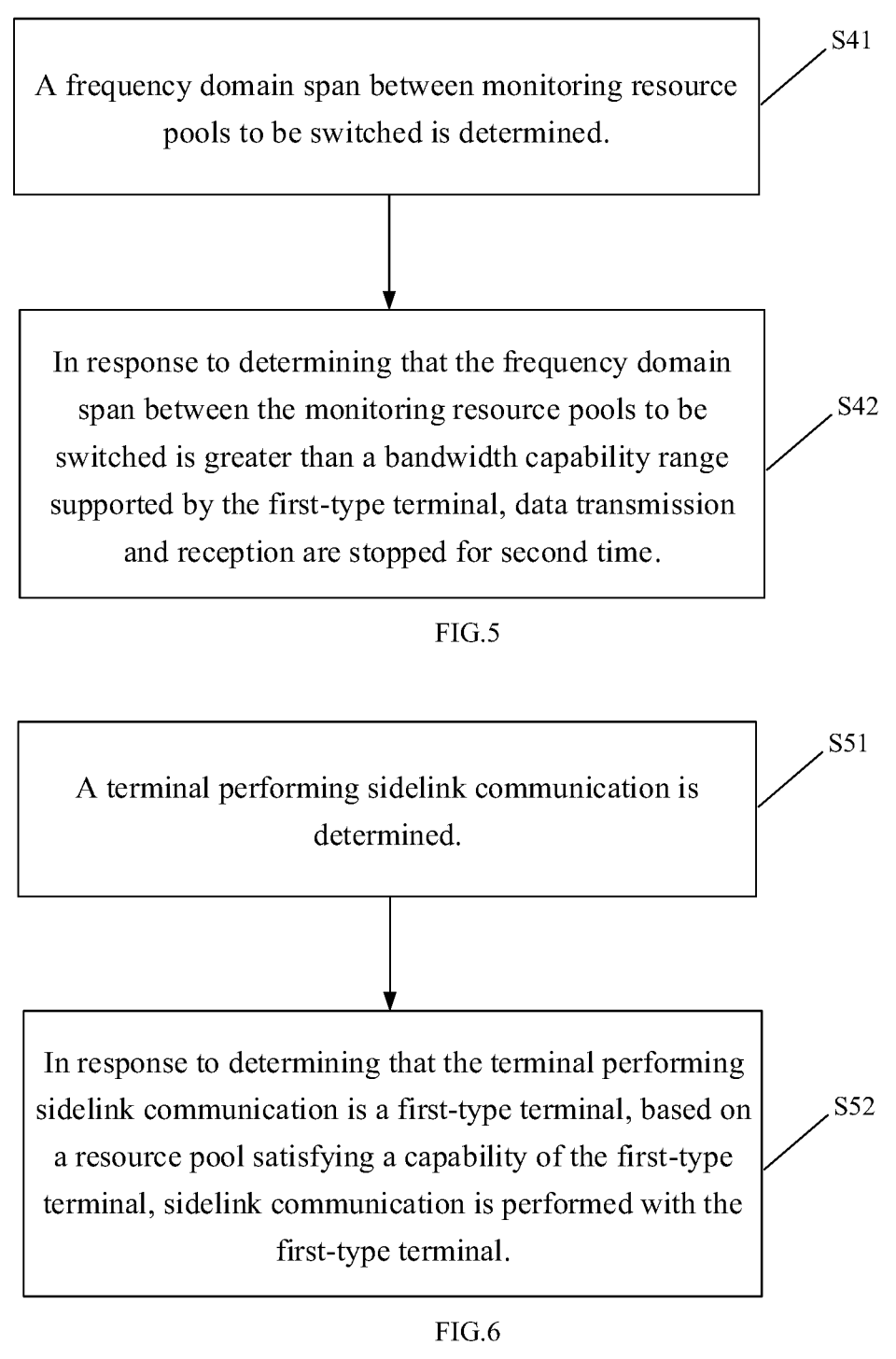

A frequency domain span between monitoring resource pools to be switched is determined. (S41)

In response to determining that the frequency domain span between the monitoring resource pools to be switched is greater than a bandwidth capability range supported by the first-type terminal, data transmission and reception are stopped for second time. (S42)

FIG.5

A terminal performing sidelink communication is determined. (S51)

In response to determining that the terminal performing sidelink communication is a first-type terminal, based on a resource pool satisfying a capability of the first-type terminal, sidelink communication is performed with the first-type terminal. (S52)

FIG.6

RESOURCE POOL CONFIGURATION METHODS AND APPARATUSES AND STORAGE MEDIA

CROSS REFERENCE TO RELATED APPLICATIONS

The present application is the U.S. national phase of PCT Application No. PCT/CN2021/106320 filed on Jul. 14, 2021, which is incorporated herein by reference in its entirety.

TECHNICAL FIELD

The present disclosure relates to the field of communication technologies and, in particular, to resource pool configuration methods and apparatuses and storage media.

BACKGROUND

In the Long Term Evolution (LTE) 4G system, in order to support Internet of Things (IoT) services, two major technologies, Machine Type Communication (MTC) and Narrowband Internet of Things (NB-IoT), are proposed. The two major technologies are mainly used for scenarios of low rate, high delay, and the like, for example, for scenarios of meter reading, environmental monitoring, and the like. The NB-IoT can only support a rate of up to several hundred kbps at present, and the MTC can only support a rate of up to several Mbps at present. Along with the continuous development of IoT services, for example, the popularization of services such as video monitoring, smart home, wearable devices, industrial sensing and monitoring, and the like, these services usually require a rate of tens to a hundred M while having a relatively high requirement for delay. Therefore, in the related arts, it is difficult for the MTC and the NB-IoT technologies to satisfy these requirements. Thus, designing a new terminal type in the 5G New Radio (NR) to satisfy the requirements of a medium-end IoT device is proposed. In the current 3rd Generation Partnership Project (3GPP) standardization, this new terminal type is called a reduced capability terminal, sometimes called a reduced capability User Equipment (UE) or a Redcap terminal, or shortened to NR-lite.

Along with the development of a new generation of 5G mobile communication technology, sidelink communication is also widely applied. A sidelink function is introduced into the Redcap terminals to expand the use scenarios of the Redcap terminals. For example, the Redcap terminals can perform information exchange directly by the sidelink function. Furthermore, the use of the sidelink function by a Redcap terminal can also help a terminal relay information to a network device, so as to enhance the coverage and achieve the purpose of saving power.

SUMMARY

In order to overcome the problems in the related arts, the present disclosure provides resource pool configuration methods and apparatuses and a storage medium.

According to a first aspect of embodiments of the present disclosure, there is provided a resource pool configuration method, which is applied to a first-type terminal. The resource pool configuration method includes:

determining resource pool configuration information, where the resource pool configuration information is used to indicate a frequency domain bandwidth of one or more resource pools, and the frequency domain bandwidth belongs to a bandwidth capability range supported by the first-type terminal.

According to a second aspect of embodiments of the present disclosure, there is provided a resource pool configuration method, which is applied to a second-type terminal. The resource pool configuration method includes:

in response to determining that a terminal performing sidelink communication is a first-type terminal, based on one or more resource pools satisfying a capability of the first-type terminal, performing sidelink communication with the first-type terminal.

According to a third aspect of embodiments of the present disclosure, there is provided a resource pool configuration method, which is applied to a network device. The resource pool configuration method includes:

determining resource pool configuration information, where the resource pool configuration information is used to indicate a frequency domain bandwidth of one or more resource pools; and sending the resource pool configuration information.

According to a fourth aspect of embodiments of the present disclosure, there is provided a resource pool configuration apparatus. The resource pool configuration apparatus includes:

a processing unit, configured to determine resource pool configuration information, where the resource pool configuration information is used to indicate a frequency domain bandwidth of one or more resource pools, and the frequency domain bandwidth belongs to a bandwidth capability range supported by a first-type terminal.

According to a fifth aspect of embodiments of the present disclosure, there is provided a resource pool configuration apparatus. The resource pool configuration apparatus includes:

a processing unit, configured to determine a terminal performing sidelink communication; and a communication unit, configured to, in response to determining that the terminal performing sidelink communication is a first-type terminal, based on one or more resource pools satisfying a capability of the first-type terminal, perform sidelink communication with the first-type terminal.

According to a sixth aspect of embodiments of the present disclosure, there is provided a resource pool configuration apparatus. The resource pool configuration apparatus includes:

- a processing unit, configured to determine resource pool configuration information, where the resource pool configuration information is used to indicate a frequency domain bandwidth of one or more resource pools; and
- a sending unit, configured to send the resource pool configuration information.

According to a seventh aspect of embodiments of the present disclosure, there is provided a resource pool configuration apparatus. The resource pool configuration apparatus includes:

- a processor; and a memory storing instructions executable by the processor;
- where the processor is configured to perform the resource pool configuration method mentioned in the first aspect or any embodiment of the first aspect.

According to an eighth aspect of embodiments of the present disclosure, there is provided a resource pool configuration apparatus. The resource pool configuration apparatus includes:

a processor; and a memory storing instructions executable by the processor;

where the processor is configured to perform the resource pool configuration method mentioned in the second aspect or any embodiment of the second aspect.

According to a ninth aspect of embodiments of the present disclosure, there is provided a resource pool configuration apparatus. The resource pool configuration apparatus includes:

a processor; and a memory storing instructions executable by the processor;

where the processor is configured to perform the resource pool configuration method mentioned in the third aspect or any embodiment of the third aspect.

According to a tenth aspect of embodiments of the present disclosure, there is provided a storage medium, where the storage medium has instructions stored thereon, which, when executed by a processor of a terminal, cause the terminal to perform the resource pool configuration method mentioned in the first aspect or any embodiment of the first aspect.

According to an eleventh aspect of embodiments of the present disclosure, there is provided a storage medium, where the storage medium has instructions stored thereon, which, when executed by a processor of a terminal, cause the terminal to perform the resource pool configuration method mentioned in the second aspect or any embodiment of the second aspect.

According to a twelfth aspect of embodiments of the present disclosure, there is provided a storage medium, where the storage medium has instructions stored thereon, which, when executed by a processor of a network device, cause the network device to perform the resource pool configuration method mentioned in the third aspect or any embodiment of the third aspect. It should be understood that the above general descriptions and subsequent detailed descriptions are merely illustrative and explanatory rather than limiting the present disclosure.

BRIEF DESCRIPTION OF DRAWINGS

The drawings herein incorporated into the specification to constitute a part of the specification illustrate the embodiments of the present disclosure and interpret the principle of the present disclosure together with the specification.

FIG. 1 is a schematic diagram illustrating a wireless communication system according to an exemplary embodiment.

FIG. 2 is a flowchart illustrating a resource pool configuration method according to an exemplary embodiment.

FIG. 3 is a flowchart illustrating a resource pool configuration method according to an exemplary embodiment.

FIG. 4 is a flowchart illustrating a resource pool configuration method according to an exemplary embodiment.

FIG. 5 is a flowchart illustrating a resource pool configuration method according to an exemplary embodiment.

FIG. 6 is a flowchart illustrating a resource pool configuration method according to an exemplary embodiment.

DETAILED DESCRIPTION

Figure 7:
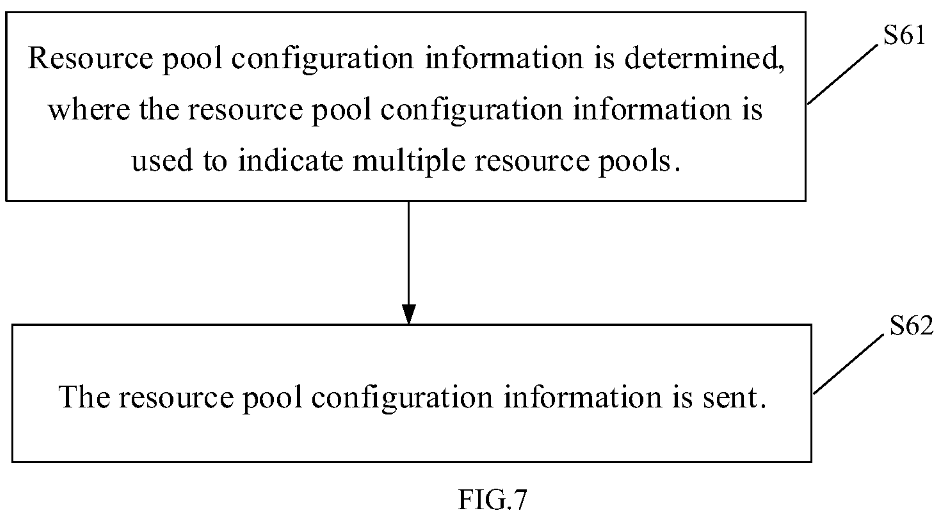
FIG. 7 is a flowchart illustrating a resource pool configuration method according to an exemplary embodiment.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

A resource pool configuration method provided by the embodiments of the present disclosure may be applied to a wireless communication system shown in FIG. 1. By referring to FIG. 1, the wireless communication system includes a terminal and a network device. Information can be sent and received between the terminal and the network device by wireless resources.

It can be understood that the wireless communication system shown in FIG. 1 is only illustrative and may further include other network device(s), for example, a core network device, a wireless relay device, a wireless backhaul device and the like, which are not shown in FIG. 1. The number of the network devices and the number of the terminals included in the wireless communication system are not limited in the embodiments of the present disclosure.

It can be further understood that the wireless communication system in the embodiments of the present disclosure is a network providing the wireless communication function. The wireless communication system may adopt different communication technologies, such as Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), Single Carrier FDMA (SC-FDMA), and Carrier Sense Multiple Access with Collision Avoidance. Based on the capacity, rate, and delay, and the like of different networks, the networks can be divided into a 2G network, a 3G network, a 4G network, and a future evolution network, such as a 5G network, which is also called New Radio (NR). For ease of description, the wireless communication network can sometimes be simply referred to as a network in the present disclosure.

Furthermore, the network device involved in the present disclosure may also be referred to as a wireless access network device. The wireless access network device may be a base station, an evolved node B, a Femtocell, an Access Point (AP) in a Wireless Fidelity (WIFI) system, a wireless relay node, a wireless backhaul node, a Transmission Point (TP), a Transmission and Reception Point (TRP) or the like, may be a gNB in an NR system, or may be a component or a part of equipment forming a base station or the like. In a case of an Internet-of-Vehicles (V2X) communication system, the network device may also be a vehicle-mounted device. It should be understood that in the embodiments of the present disclosure, the specific technology and specific equipment morphology adopted by the network device are not limited.

Furthermore, the terminal involved in the present disclosure may also be referred to as a terminal device, a UE, a Mobile Station (MS), a Mobile Terminal (MT), or the like, which is a device providing voice and/or data connectivity to a user. For example, the terminal may be a palm-held device, a vehicle-mounted device, or the like, which has a wireless connection function. At present, some terminals may be, for example, mobile phones, Pocket Personal Computers (PPCs), palmtop computers, Personal Digital Assistants (PDAs), laptop computers, tablet computers, wearable devices, vehicle-mounted devices, or the like. Furthermore, in a case of a V2X communication system, the terminal device may also be a vehicle-mounted device. It should be understood that in the embodiments of the present disclosure, the specific technology and specific equipment morphology adopted by the terminal are not limited.

The terminal involved in the embodiments of the present disclosure may be understood as a new-type terminal designed in the 5G NR: a reduced capability terminal. The reduced capability terminal is sometimes also referred to as a reduced capability UE, or referred to as a Redcap terminal, or shortened to NR-lite. In the embodiments of the present disclosure, the new terminal is called a Redcap terminal.

Similar to the Internet of Things (IoT) device in the LTE, the 5G NR-lite usually needs to satisfy the following requirements:

low cost and low complexity;

coverage enhancement to some extent; and power saving.

Because the current NR system is designed for the high-end terminals with high rate, low delay, and the like, the current design cannot satisfy the above requirements of the NR-lite. Therefore, it is required to renovate the current NR system to satisfy the requirements of the NR-lite. For example, in order to satisfy the requirements of low cost, low complexity, and the like, the Radio Frequency (RF) bandwidth of the NR-IoT can be limited to, for example, 5 MHz or 10 MHz; or a size of a buffer of the NR-lite can be limited so as to limit a size of a transmission block received each time; or the like. For power saving, a possible optimization direction is simplifying the communication flow and reducing the number of times that the NR-lite terminal detects a downlink control channel, and the like.

In related arts, a sidelink function is introduced into the Redcap terminals to expand the use cases of the Redcap terminals. For example, the Redcap terminals can exchange information directly by a sidelink function. Furthermore, the use of the sidelink function by a Redcap terminal can also help a terminal relay information to a network device, so as to enhance the coverage and achieve the purpose of power saving.

However, during configuring sidelink function, one sidelink BandWidth Part (BWP) can be configured in a unified way. For the Redcap terminals, limited by the bandwidth capability of the Redcap terminals, the unified configuration of the sidelink BWP will impact the communication performance of the Redcap terminals. For example, one or more resource pools may be configured in one sidelink BWP. The terminals are configured with one or more resource pools to perform transmission and reception by using resources in the resource pool(s). The bandwidth of the current sidelink BWP may be greater than 20 MHz under Frequency Range (FR) 1 and may be greater than 100 MHz under FR2. Due to limited bandwidth capability, the bandwidth of the Redcap terminals is up to 20 MHz under FR1 and up to 100 MHz under FR2. Therefore, the resource pool configuration solution based on the current sidelink BWP will limit the communication performance of the Redcap terminals. That is to say, due to the limitation of the bandwidth capability of the Redcap terminals, it is required to consider the limitation of the bandwidth capability factor of the Redcap terminals in the configuration and use of the resource pool. But no consideration is given in the current configuration and use of the resource pool to the limitation of the bandwidth capability factor of the Redcap terminals.

The technical solutions provided by the embodiments of the present disclosure can bring the following beneficial effects: a determined resource pool configuration information is used to indicate a frequency domain bandwidth of the resource pools, and the frequency domain bandwidth belongs to a bandwidth capability range supported by a first-type terminal, so as to configure a resource pool for a specific type of terminal.

An embodiment of the present disclosure provides a resource pool configuration method, in which, based on a bandwidth capability range supported by a terminal, a resource pool with a frequency domain bandwidth within a bandwidth capability range supported by the terminal is configured.

In the resource pool configuration method provided by the embodiments of the present disclosure, based on the bandwidth capabilities of different types of terminals, a resource pool may be configured for a specific type of terminal.

Different types of terminals have different capabilities. For example, the capability of the terminals may include a transceiving bandwidth, a transceiving antenna number, a maximum bit number of a transmission block, processing time delay, and the like. The capabilities of the terminals may differ in one or more of the transceiving bandwidth, the transceiving antenna number, the maximum bit number of transmission block, and the processing time delay.

In the embodiments of the present disclosure, for ease of descriptions, any two different types of terminals among the different types of terminals may be referred to as a first-type terminal and a second-type terminal, respectively.

In the embodiments of the present disclosure, the first-type terminal and the second-type terminal may have different capabilities. For example, the capability of the terminals may include a transceiving bandwidth, a transceiving antenna number, a maximum bit number of transmission block, processing time delay, and the like. The capabilities of the terminals may differ in one or more of the transceiving bandwidth, the transceiving antenna number, the maximum bit number of transmission block, and the processing time delay.

In one embodiment, the capability of the first-type terminal is lower than the capability of the second-type terminal. For example, the first-type terminal may be a Redcap terminal, and the second-type terminal may be an NR terminal.

In one embodiment, in the resource pool configuration method provided by the embodiments of the present disclosure, a resource pool whose frequency domain bandwidth falls within a bandwidth capability range of the Redcap terminal is configured, namely, the frequency domain bandwidth of the resource pool configured by a system for the Redcap terminal is less than or equal to the bandwidth capability of the Redcap terminal.

FIG. 2 is a flowchart illustrating a resource pool configuration method according to an exemplary embodiment. The resource pool configuration method may be performed separately or in combination with other embodiments of the present disclosure. As shown in FIG. 2, the resource pool configuration method is performed by a first-type terminal and may include the following steps.

At step S11, resource pool configuration information is determined, where the resource pool configuration information is used to indicate a frequency domain bandwidth of a resource pool, and the frequency domain bandwidth of the resource pool indicated by the resource pool configuration information belongs to a bandwidth capability range supported by the first-type terminal.

The fact that the frequency domain bandwidth belongs to the bandwidth capability range supported by the first-type terminal can be understood as that the frequency domain bandwidth is less than or equal to a bandwidth supported by the first-type terminal.

In an embodiment of the present disclosure, the frequency domain bandwidth of the resource pool configured for the first-type terminal belongs to the bandwidth capability range supported by the first-type terminal, such that the configured resource pool conforms to the capability of the first-type terminal.

For example, the first-type terminal is a Redcap terminal, and the frequency domain bandwidth of the resource pool configured for the Redcap terminal belongs to the bandwidth capability range of the Redcap terminal, so as to achieve the resource pool configuration conforming to the bandwidth capability of the Redcap terminal and improve the compatibility of the sidelink system with the Redcap terminal.

In the resource pool configuration method provided by the embodiments of the present disclosure, multiple resource pools may be configured; namely, the resource pool configuration information configured for the first-type terminal may be used to indicate multiple resource pools.

In an embodiment of the present disclosure, multiple resource pools are configured for a specified-type terminal in a sidelink communication system. For example, multiple resource pools may be configured for the first-type terminal (Redcap terminal), such that the Redcap terminal can perform sidelink communication in the resource pool(s) suitable for the Redcap terminal.

In an embodiment of the present disclosure, the multiple resource pools configured for the first-type terminal need to satisfy a set condition to ensure that the first-type terminal can perform sidelink communication.

In one manner, a total bandwidth (i.e., frequency span) of continuous resources covering the multiple configured resource pools belongs to the bandwidth capability range supported by the first-type terminal.

Figures 3, 4:
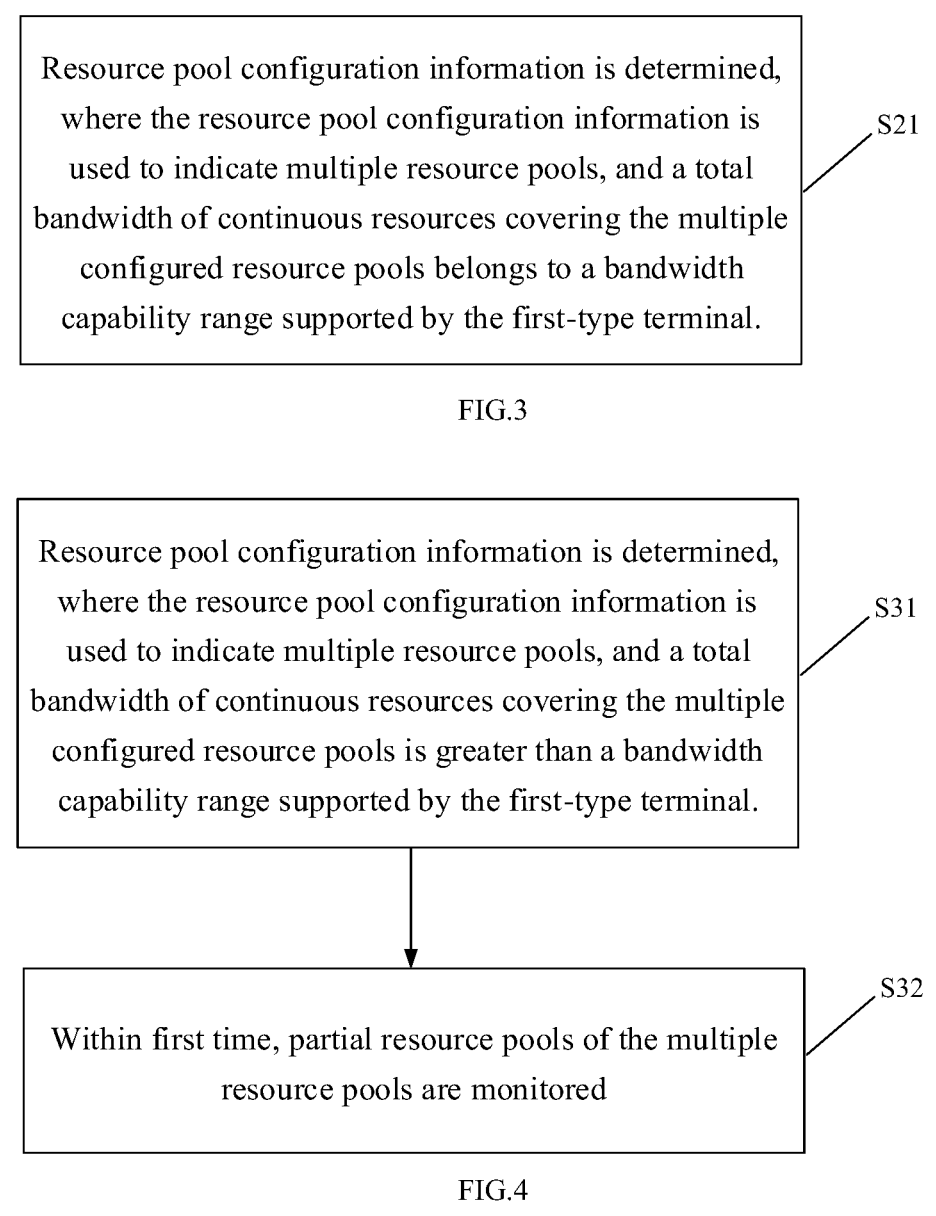

FIG. 3 is a flowchart illustrating a resource pool configuration method according to an exemplary embodiment. The resource pool configuration method can be performed separately or in combination with other embodiments in the present disclosure. As shown in FIG. 3, the resource pool configuration method is applied to a first-type terminal and includes the following step.

At step S21, resource pool configuration information is determined, where the resource pool configuration information is used to indicate multiple resource pools, and a total bandwidth of continuous resources covering the multiple configured resource pools belongs to a bandwidth capability range supported by the first-type terminal.

The total bandwidth of the continuous resources covering the multiple configured resource pools belongs to the bandwidth capability range supported by the first-type terminal, that is, the total bandwidth of the continuous resources covering the multiple configured resource pools is less than or equal to the bandwidth capability range supported by the first-type terminal, such that a frequency domain bandwidth of each of the multiple resource pools falls within the bandwidth capability range supported by the first-type terminal, and the configured resource pools conform to the capability of the first-type terminal.

In another manner, the total bandwidth of the continuous resources covering the multiple configured resource pools is greater than the bandwidth capability range supported by the first-type terminal. When the total bandwidth of the continuous resources covering the multiple configured resource pools is greater than the bandwidth capability range supported by the first-type terminal, the first-type terminal does not need to monitor all resource pools within a specific time, but monitors partial resource pools of the multiple resource pools within the specific time. A total bandwidth of the continuous resources of the partial resource pools of the multiple resource pools monitored by the first-type terminal within the specific time belongs to the bandwidth capability range supported by the first-type terminal.

FIG. 4 is a flowchart illustrating a resource pool configuration method according to an exemplary embodiment. As shown in FIG. 4, the resource pool configuration method is applied to a first-type terminal and includes the following steps.

At step S31, resource pool configuration information is determined, where the resource pool configuration information is used to indicate multiple resource pools, and a total bandwidth of continuous resources covering the multiple configured resource pools is greater than a bandwidth capability range supported by the first-type terminal.

At step S32, within first time, partial resource pools of the multiple resource pools are monitored.

A total bandwidth of continuous resources covering the monitored partial resource pools belongs to the bandwidth capability range supported by the first-type terminal.

In the resource pool configuration method provided by the embodiments of the present disclosure, the first-type terminal may perform communication with another terminal based on the multiple configured resource pools. When the first-type terminal performs communication with another terminal, if the another terminal is not a first-type terminal, in order to enable the terminal performing sidelink communication to use a resource pool matching its capability, the first-type terminal in this embodiment of the present disclosure may send capability information to another device, which is different from the first-type terminal, to indicate the capability of the first-type terminal. For example, the another device may be a resource scheduling device, such as a network device, or a second-type terminal performing sidelink communication with the first-type terminal, so that the first-type terminal can subsequently perform sidelink communication based on the capability of the first-type terminal.

In an embodiment of the present disclosure, when the first-type terminal performs sidelink communication based on the multiple resource pools, switching among the monitored resource pools can be performed.

FIG. 5 is a flowchart illustrating a resource pool configuration method according to an exemplary embodiment. As shown in FIG. 5, the resource pool configuration method is applied to a first-type terminal and includes the following steps.

At step S41, a frequency domain span between monitoring resource pools to be switched is determined.

At step S42, in response to determining that the frequency domain span between the monitoring resource pools to be switched is greater than a bandwidth capability range supported by the first-type terminal, data transmission and reception are stopped for the second time.

In an embodiment of the present disclosure, in response to determining that the frequency domain span between the monitoring resource pools to be switched is greater than the bandwidth capability range supported by the first-type terminal, data transmission and reception are stopped within the second time, which can be understood as that, when switching is performed from one resource pool to another resource pool, if bandwidth limitation of resource pool switching is not satisfied, switching delay is set, within which a high-level device processes and the terminal cannot receive and send. For example, when it is determined to switch to resource pool 2 at slot 1, several symbols at the start of slot 1 are the switching delay, and the sender cannot send information by these symbols to the terminal performing switching.

In one example, the first-type terminal is a Redcap terminal. When the Redcap terminal needs to switch from one monitoring resource pool to another resource pool for monitoring, if the frequency domain span of the two resource pools before and after switching is greater than the bandwidth capability supported by the Redcap terminal, switching delay (second time) is defined, and within the switching delay, the terminal cannot send and receive any data, so as to improve the communication validity.

In the resource pool configuration method provided by the embodiments of the present disclosure, multiple resource pools can be configured. The multiple resource pools may have different bandwidth capabilities, such that the terminals with different capability types can perform sidelink communication based on one or more resource pools suitable for its bandwidth capability. For example, one or more resource pools supporting the bandwidth capability of the Redcap terminal are determined from the multiple resource pools, such that the Redcap terminal can perform sidelink communication in the one or more resource pools suitable for the Redcap terminal.

In one embodiment, the terminals performing sidelink communication are the first-type terminal and the second-type terminal (a non-first-type terminal, for example, an NR terminal or a normal terminal). When the communication object of the second-type terminal includes the first-type terminal, the configured resource pools need to include a resource pool within the bandwidth capability range supported by the first-type terminal.

FIG. 6 is a flowchart illustrating a resource pool configuration method according to an exemplary embodiment. As shown in FIG. 6, the resource pool configuration method is performed by a second-type terminal and includes the following steps.

At step S51, a terminal performing sidelink communication is determined.

At step S52, in response to determining that the terminal performing sidelink communication is a first-type terminal, based on a resource pool satisfying a capability of the first-type terminal, sidelink communication is performed with the first-type terminal.

In an embodiment of the present disclosure, the second-type terminal, for example, the NR terminal may, when determining the communication object for sidelink communication is the first-type terminal, perform sidelink communication with the first-type terminal based on a resource pool satisfying the capability of the first-type terminal, so as to realize communication conforming to the capability of the first-type terminal, for example, performing information transmission or monitoring. For example, for the NR terminal, if the communication object includes a Redcap terminal, the configured resource pools must at least include one resource pool supported by the capability of the Redcap terminal.

In an embodiment of the present disclosure, when performing communication with another terminal, the second-type terminal can determine the capability of the terminal. If the communication object includes the first-type terminal, the second-type terminal can perform sidelink communication with the first-type terminal based on a resource pool satisfying the capability of the first-type terminal.

In one embodiment, the second-type terminal may receive capability information from the first-type terminal, where the capability information is used to indicate the capability of the first-type terminal. The second-type terminal determines the capability of the first-type terminal based on the received capability information.

In one embodiment, when performing communication with the first-type terminal, the second-type terminal may determine one or more resource pools satisfying the capability of the first-type terminal among the multiple configured resource pools.

The multiple configured resource pools may be configured for the first-type terminal or jointly configured for both the second-type terminal and the first-type terminal.

In the resource pool configuration method provided by the embodiments of the present disclosure, the above-mentioned resource pool configuration manners may be configured by a network device.

Based on a similar idea, an embodiment of the present disclosure provides a resource pool configuration method performed by a network device.

FIG. 7 is a flowchart illustrating a resource pool configuration method according to an exemplary embodiment. As shown in FIG. 7, the resource pool configuration method is applied to a network device and includes the following steps.

At step S61, resource pool configuration information is determined, where the resource pool configuration information is used to indicate multiple resource pools.

At step S62, the resource pool configuration information is sent.

In one embodiment, the resource pool configuration information configured by the network device is used to indicate multiple resource pools.

In one embodiment, a total bandwidth of continuous resources covering the multiple resource pools belongs to a bandwidth capability range supported by a first-type terminal. In another embodiment, the total bandwidth of the continuous resources covering the multiple resource pools is greater than the bandwidth capability range supported by the first-type terminal. A total bandwidth of continuous resources covering partial resource pools in the multiple resource pools belongs to the bandwidth capability range supported by the first-type terminal.

In an embodiment of the present disclosure, the first-type terminal mentioned above may be a Redcap terminal.

In the resource pool configuration method provided by the embodiments of the present disclosure, the network device configures one or more resource pools belonging to the bandwidth capability range supported by the first-type terminal, such that the first-type terminal performs sidelink communication normally and a sidelink system can be compatible with the first-type terminal. For example, the first-type terminal is a Redcap terminal. In the resource pool configuration method provided by the embodiments of the present disclosure, the sidelink system is capable of being compatible with the Redcap terminal.

The resource pool configuration method provided by the embodiments of the present disclosure is applicable to scenarios in which sidelink communication interaction is performed between terminals and resource pool(s) is configured, and also applicable to scenarios in which the terminal interacts with the network device to achieve configuration of the resource pool(s). The functions of the terminal and the network device involved in the specific implementation process can be referred to relevant descriptions of the above-mentioned embodiments and will not be repeated herein.

It is to be noted that those skilled in the arts can understand that various implementations/examples involved in the above embodiments of the present disclosure can be used in combination with the preceding embodiments or used independently. The use alone and the use in combination with the preceding embodiments are based on the similar principle. In an embodiment of the present disclosure, some embodiments are described as used together. Of course, those skilled in the arts can understand that such exemplary descriptions are not intended to limit the embodiments of the present disclosure.

Based on a similar idea, an embodiment of the present disclosure further provides a resource pool configuration apparatus.

It can be understood that the resource pool configuration apparatus provided by the embodiments of the present disclosure includes, for the purpose of performing the above functions, corresponding hardware structure and/or software modules for performing each function. In combination with exemplary units and algorithm steps disclosed in the embodiments of the present disclosure, the embodiments of the present disclosure can be implemented by hardware or by a combination of hardware and computer software. Whether a particular function is executed by hardware or by computer software driving the hardware depends on the specific applications and design constraints of the technical solutions. Those skilled in the arts can use a different method for each specific application to perform the described functions, but this implementation shall not exceed the scope of the technical solutions of the embodiments of the present disclosure.

Figure 8:
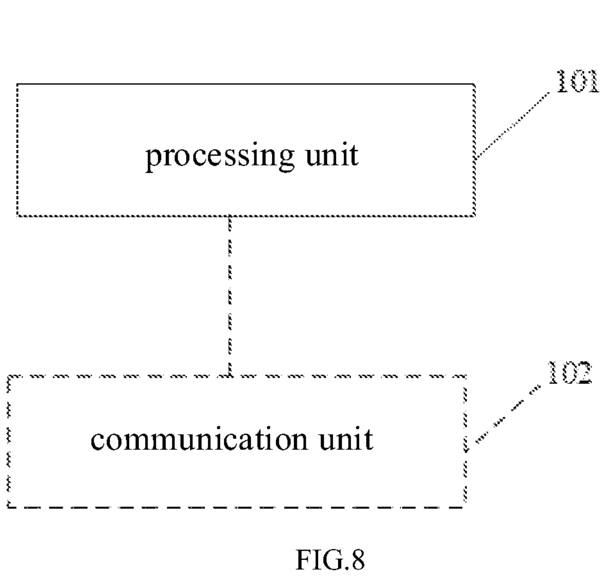
FIG. 8 is a block diagram illustrating a resource pool configuration apparatus according to an exemplary embodiment.

FIG. 8 is a block diagram illustrating a resource pool configuration apparatus according to an exemplary embodiment. As shown in FIG. 8, the resource pool configuration apparatus 100 includes a processing unit 101.

The processing unit 101 is configured to determine resource pool configuration information, where the resource pool configuration information is used to indicate a frequency domain bandwidth of one or more resource pools, and the frequency domain bandwidth belongs to a bandwidth capability range supported by a first-type terminal.

In one embodiment, the resource pool configuration information is used to indicate multiple resource pools.

In one embodiment, a total bandwidth of continuous resources covering the multiple resource pools belongs to the bandwidth capability range supported by the first-type terminal.

In one embodiment, a total bandwidth of continuous resources covering the multiple resource pools is greater than the bandwidth capability range supported by the first-type terminal. The processing unit 101 is further configured to: within first time, monitor partial resource pools of the multiple resource pools. A total bandwidth of continuous resources covering the partial resource pools belongs to the bandwidth capability range supported by the first-type terminal.

In one embodiment, the resource pool configuration apparatus 100 further includes a communication unit 102, which is configured to: send capability information to another device different from the first-type terminal, where the capability information is used to indicate a capability of the first-type terminal.

In one embodiment, the resource pool configuration apparatus 100 further includes a communication unit 102 which is configured to: in response to determining that a frequency domain span between monitoring resource pools to be switched is greater than the bandwidth capability range supported by the first-type terminal, stop data transmission and reception within second time.

Figure 9:
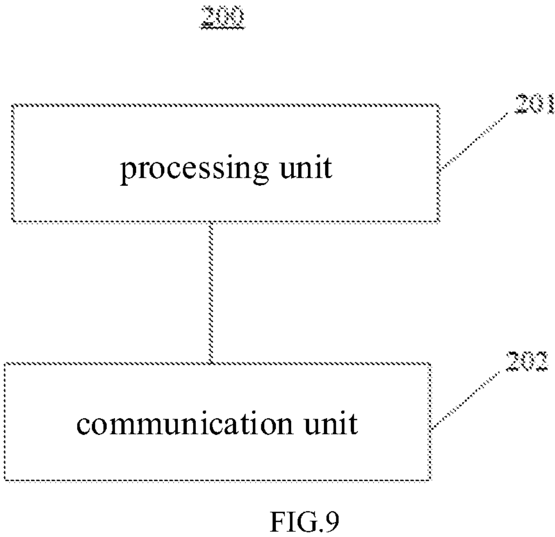
FIG. 9 is a block diagram illustrating a resource pool configuration apparatus according to an exemplary embodiment.

FIG. 9 is a block diagram illustrating a resource pool configuration apparatus according to an exemplary embodiment. As shown in FIG. 9, the resource pool configuration apparatus 200 includes a processing unit 201 and a communication unit 202.

The processing unit 201 is configured to determine a terminal performing sidelink communication; and the communication unit 202 is configured to, in response to determining that the terminal performing sidelink communication is a first-type terminal, based on one or more resource pools satisfying a capability of the first-type terminal, perform sidelink communication with the first-type terminal.

In one embodiment, the communication unit 202 is further configured to: receive capability information from the first-type terminal, where the capability information is used to indicate the capability of the first-type terminal.

In one embodiment, the one or more resource pools satisfying the capability of the first-type terminal are determined from multiple resource pools.

Figure 10:
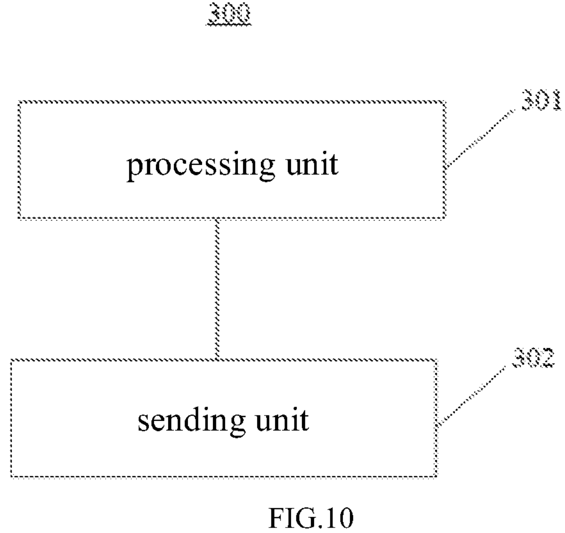
FIG. 10 is a block diagram illustrating a resource pool configuration apparatus according to an exemplary embodiment.

FIG. 10 is a block diagram illustrating a resource pool configuration apparatus according to an exemplary embodiment. As shown in FIG. 10, the resource pool configuration apparatus 300 includes a processing unit 301 and a sending unit 302.

The processing unit 301 is configured to determine resource pool configuration information, where the resource pool configuration information is used to indicate a frequency bandwidth of one or more resource pools.

The sending unit 302 is configured to send the resource pool configuration information.

In one embodiment, the resource pool configuration information is used to indicate multiple resource pools.

In one embodiment, a total bandwidth of continuous resources covering the multiple resource pools belongs to a bandwidth capability range supported by a first-type terminal.

In one embodiment, a total bandwidth of continuous resources covering the multiple resource pools is greater than a bandwidth capability range supported by a first-type terminal; a total bandwidth of continuous resources covering partial resource pools of the multiple resource pools belongs to the bandwidth capability range supported by the first-type terminal.

The specific manner in which each module in the apparatuses of the above embodiments performs operations has been detailed in the method embodiments and will not be repeated herein.

Figure 11:
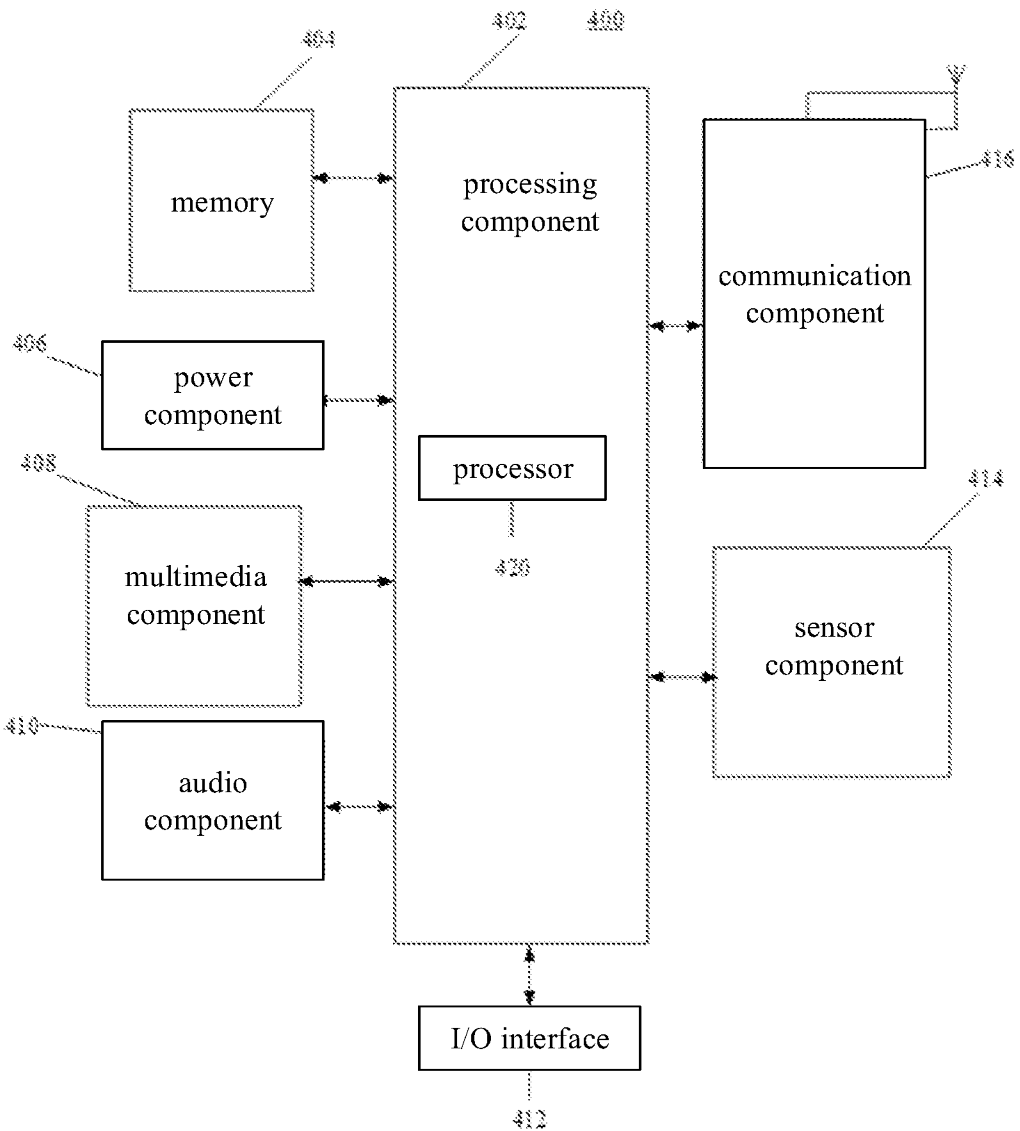
FIG. 11 is a block diagram illustrating an apparatus for configuring a resource pool according to an exemplary embodiment.

FIG. 11 is a block diagram illustrating an apparatus for configuring a resource pool according to an exemplary embodiment. The apparatus 400 for configuring a resource pool may be the first-type terminal or the second-type terminal mentioned in the above embodiments. For example, the apparatus 400 may be a mobile phone, a computer, a digital broadcast terminal, a message transceiver, a game console, a tablet device, a medical device, a fitness device, a personal digital assistant, and the like.

As shown in FIG. 11, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 generally controls overall operations of the apparatus 400, such as operations associated with display, phone calls, data communications, camera operations, and recording operations. The processing component 402 may include one or more processors 420 to execute instructions to complete all or part of the steps of the above methods. In addition, the processing component 402 may include one or more modules that facilitate the interaction between the processing component 402 and other components. For example, the processing component 402 may include a multimedia module to facilitate the interaction between the multimedia component 408 and the processing component 402.

The memory 404 is configured to store various types of data to support the operation of the apparatus 400. Examples of such data include instructions for any application or method operated on the apparatus 400, contact person data, phonebook data, messages, pictures, videos, and so on. The memory 404 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power component 406 provides power for various components of the apparatus 400. The power component 406 may include a power management system, one or more power sources, and other components associated with power generated, managed, and distributed for the apparatus 400.

The multimedia component 408 includes a screen that provides an output interface between the apparatus 400 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 408 includes a front camera and/or a rear camera. When the apparatus 400 is in an operation mode, such as a photographing mode or a video mode, the front camera and/or the rear camera may receive external multimedia data. Each of the front and rear cameras may be a fixed optical lens system or have a focal length and an optical zoom capability.

The audio component 410 is configured to output and/or input audio signals. For example, the audio component 410 includes a microphone (MIC) configured to receive an external audio signal when the apparatus 400 is in an operation mode, such as a call mode, a recording mode, and a voice recognition mode. The received audio signal may be further stored in the memory 404 or transmitted via the communication component 416. In some examples, the audio component 410 also includes a loudspeaker for outputting an audio signal.

The I/O interface 412 provides an interface between the processing component 402 and a peripheral interface module, which may be a keyboard, a click wheel, a button, or the like. These buttons may include, but are not limited to, a home button, a volume button, a start button, and a lock button.

The sensor component 414 includes one or more sensors for providing a status assessment in various aspects to the apparatus 400. For example, the sensor component 414 may detect an on/off status of the apparatus 400, and relative positioning of the component, for example, the component is a display and a keypad of the apparatus 400. The sensor component 414 may also detect a change in position of the apparatus 400 or a component of the apparatus 400, a presence or absence of contact between a user and the apparatus 400, the orientation or acceleration/deceleration of the apparatus 400, and a change in temperature of the apparatus 400. The sensor component 414 may include a proximity sensor configured to detect the presence of nearby objects without any physical contact. The sensor component 414 may also include a light sensor, such as a CMOS or CCD image sensor, for use in imaging applications. In some examples, the sensor component 414 may also include an acceleration sensor, a gyro sensor, a magnetic sensor, a pressure sensor, or a temperature sensor.

The communication component 416 is configured to facilitate wired or wireless communication between the apparatus 400 and other devices. The apparatus 400 may access a wireless network based on a communication standard, such as WiFi, 2G or 3G, or a combination thereof. In an example, the communication component 416 receives broadcast signals or broadcast-related information from an external broadcast management system via a broadcast channel. In an example, the communication component 416 may further include a Near Field Communication (NFC) module for promoting short-range communication. For example, the NFC module may be implemented based on a Radio Frequency Identification (RFID) technology, an Infrared Data Association (IrDA) technology, an Ultrawideband (UWB) technology, a Bluetooth (BT) technology, and other technologies.

In an exemplary embodiment, the apparatus 400 may be implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor or other electronic elements for performing the above methods.

In an exemplary embodiment, there is also provided a non-transitory computer-readable storage medium including instructions, such as a memory 404 including instructions, where the instructions are executable by the processor 420 of the apparatus 400 to implement the methods as described above. For example, the non-transitory computer-readable storage medium may be a Read Only Memory (ROM), a Random Access Memory (RAM), a CD-ROM, a magnetic tape, a floppy disk, an optical data storage device, and the like.

Figure 12:
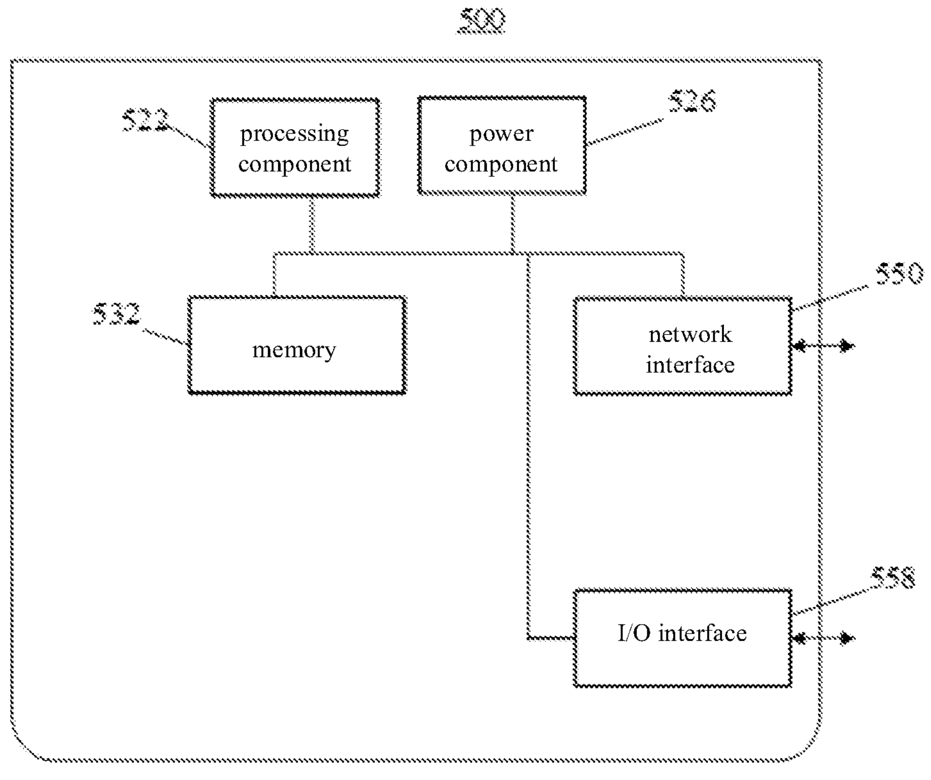
FIG. 12 is a block diagram illustrating an apparatus for configuring a resource pool according to an exemplary embodiment.

FIG. 12 is a block diagram illustrating an apparatus for configuring a resource pool according to an exemplary embodiment. For example, the apparatus 500 may be provided as a network device. As shown in FIG. 12, the apparatus 500 may include a processing component 522, which further includes one or more processors and memory resources represented by memory 532 for storing instructions executed by the processing component 522, for example, an application program. The application program stored in the memory 532 may include one or more modules, each of which corresponds to one set of instructions. Further, the processing component 522 is configured to execute instructions to perform the above methods.

The apparatus 500 further includes one power component 526 configured to execute power management for the apparatus 500, one wired or wireless network interface 550 configured to connect the apparatus 500 to a network, and one input/output (I/O) interface 558. The apparatus 500 may operate an operating system stored in the memory 532, such as Windows Server™, Mac OS X™, Unix™, Linux™ and FreeBSD™.

In an exemplary embodiment, there is also provided a non-transitory computer-readable storage medium including instructions, such as a memory 532 including instructions, where the instructions are executable by the processing component 522 of the apparatus 500 to implement the methods as described above. For example, the non-transitory computer-readable storage medium may be a Read Only Memory (ROM), a Random Access Memory (RAM), a CD-ROM, a magnetic tape, a floppy disk, an optical data storage device, and the like.

It is further understood that "multiple" in the present disclosure refers to two or more, and other quantifiers have similar meanings. The "and/or" is used to describe the association relationship of associated objects and represents three relationships, for example, A and/or B may represent that A exists alone, both A and B exist at the same time, and B exists alone. The character "/" generally represents an "or" relationship of the objects associated back and forth. The terms "a," "said," and "the" in singular form are also intended to include plural form, unless otherwise clearly stated in the context.

It is further understood that although different information may be described using terms such as "first," "second," etc., this information should not be limited to these terms. These terms are used only to distinguish one type of information from another and do not represent a specific sequence or importance. Actually, the terms "first" and "second" and the like can be exchanged. For example, without departing from the scope of the present disclosure, the first information may also be referred to as the second information, and similarly, the second information may also be referred to as the first information.

It may be further understood that operations are described in a specific sequence in the drawings in the embodiments of the present disclosure, but it shall not be understood as requiring that these operations are performed in the shown specific sequence or serial sequence, or that all operations shown are performed to achieve a desired result. In a specific environment, multi-task processing and parallel processing may also be advantageous.

Other implementations of the present disclosure will be apparent to those skilled in the art from consideration of the specification and practice of the present disclosure herein. The present disclosure is intended to cover any variations, modifications, or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structures that have been described above and shown in the drawings, and various modifications and changes may be made without departing from the scope thereof. The scope of the present disclosure is only limited by the appended claims.

The invention claimed is:

1. A resource pool configuration method, applied to a reduced capability (RedCap) terminal, comprising:

determining resource pool configuration information, wherein the resource pool configuration information is used to indicate a plurality of resource pools, and a total bandwidth of continuous resources covering the plurality of resource pools is greater than a bandwidth capability range supported by the RedCap terminal; and within first time, monitoring partial resource pools of the plurality of resource pools, wherein a total bandwidth of continuous resources covering the partial resource pools belongs to the bandwidth capability range supported by the RedCap terminal;

wherein the resource pool configuration method further comprises:

in response to determining that a frequency domain span between monitoring resource pools to be switched is greater than the bandwidth capability range supported by the RedCap terminal, stopping data transmission and reception within second time.

2. The resource pool configuration method of claim 1, further comprising:

sending capability information to another device different from the RedCap terminal, wherein the capability information is used to indicate a capability of the RedCap terminal.

3. A resource pool configuration apparatus, comprising:

a processor; and a memory storing instructions executable by the processor;

wherein the processor is configured to perform the resource pool configuration method of claim 1.

4. A non-transitory storage medium storing instructions that when executed by one or more processors of a terminal cause the terminal to perform the resource pool configuration method of claim 1.

5. The resource pool configuration method of claim 2, wherein the capability of the RedCap terminal comprises at least one of: a transceiving bandwidth, a transceiving antenna number, a maximum bit number of a transmission block, or a processing time delay.

6. The resource pool configuration method of claim 2, wherein the another device comprises a network device.

7. The resource pool configuration method of claim 2, wherein the another device comprises a new radio (NR) terminal performing sidelink communication with the RedCap terminal.

8. The resource pool configuration method of claim 1, wherein the second time is a switching delay from one resource pool to another resource pool, and stopping the data transmission and reception within the second time comprises:

stopping the data transmission and reception within the switching delay.

9. A resource pool configuration method, applied to a new radio (NR) terminal, comprising:

in response to determining that a terminal performing sidelink communication is a reduced capability (RedCap) terminal, based on one or more resource pools satisfying a capability of the RedCap terminal, performing the sidelink communication with the RedCap terminal;

wherein the one or more resource pools satisfying the capability of the RedCap terminal are determined from a plurality of resource pools, a total bandwidth of continuous resources covering the plurality of resource pools is greater than a bandwidth capability range supported by the RedCap terminal, and a total bandwidth of continuous resources covering partial resource pools of the plurality of resource pools belongs to the bandwidth capability range supported by the RedCap terminal.

10. The resource pool configuration method of claim 9, further comprising:

receiving capability information from the RedCap terminal, wherein the capability information is used to indicate the capability of the RedCap terminal.

11. A resource pool configuration apparatus, comprising:

a memory; and one or more processors that are communicatively coupled to the memory;

wherein the one or more processors are collectively configured to perform the resource pool configuration method of claim 9.

12. A non-transitory storage medium storing instructions that when executed by one or more processors of a terminal causes the terminal to perform the resource pool configuration method of claim 9.

13. The resource pool configuration method of claim 10, wherein the capability of the RedCap terminal comprises at least one of: a transceiving bandwidth, a transceiving antenna number, a maximum bit number of a transmission block, or a processing time delay.

14. The resource pool configuration method of claim 9, wherein the plurality of resource pools are configured for the RedCap terminal.

15. The resource pool configuration method of claim 9, wherein the plurality of resource pools are jointly configured for the RedCap terminal and the NR terminal.

16. A resource pool configuration method, applied to a network device, comprising:

determining resource pool configuration information; and sending the resource pool configuration information;

wherein the resource pool configuration information is used to indicate a plurality of resource pools, a total bandwidth of continuous resources covering the plurality of resource pools is greater than a bandwidth capability range supported by a reduced capability (RedCap) terminal, and a total bandwidth of continuous resources covering partial resource pools of the plurality of resource pools belongs to the bandwidth capability range supported by the RedCap terminal.

17. A resource pool configuration apparatus, comprising:

a memory; and one or more processors that are communicatively coupled to the memory;

wherein the one or more processors are collectively configured to perform the resource pool configuration method of claim 16.

18. A non-transitory storage medium storing instructions that when executed by one or more processors of a terminal causes the terminal to perform the resource pool configuration method of claim 16.

19. The resource pool configuration method of claim 16, further comprising:

receiving capability information from the RedCap terminal, wherein the capability information is used to indicate a capability of the RedCap terminal.

20. The resource pool configuration method of claim 19, wherein the capability of the RedCap terminal comprises at least one of: a transceiving bandwidth, a transceiving antenna number, a maximum bit number of a transmission block, or a processing time delay.

* * * * *